ized Patent  [15] 3,645,029
Roemer  [45] Feb. 29, 1972

[54] ICE FISHING TIP-UP
[72] Inventor: Benjamin C. Roemer, Manitowish Waters, Wis.
[73] Assignee: Trueflight Mfg. Co., Inc., Manitowish Waters, Wis.
[22] Filed: Sept. 14, 1970
[21] Appl. No.: 71,820

[52] U.S. Cl. ............................................. 43/17, 24/201 B
[51] Int. Cl. ........................................................ A01k 97/12
[58] Field of Search ................................. 43/17; 24/201 B

[56] References Cited

UNITED STATES PATENTS

| 3,213,561 | 10/1965 | Roemer | 43/17 |
| 3,041,697 | 7/1962 | Budreck | 24/201 B |
| 2,936,541 | 5/1960 | Stanford | 43/17 |
| 1,173,827 | 2/1916 | Marsh | 43/17 |

Primary Examiner—Samuel Koren
Assistant Examiner—J. F. Pitrelli
Attorney—John W. Michael, Gerrit D. Foster, Bayard H. Michael, Paul R. Puerner, Joseph A. Gemignani, Andrew O. Riteris and Spencer B. Michael

[57] ABSTRACT

An ice fishing tip-up including a tube having a sealed end and an open end and a stand for the tube to position it with the sealed end below the surface of the ice and with the open end projecting above the surface of the ice. A visual signal member is mounted inside the tube for movement between a nonsignaling position within the tube and a signaling position outside the tube. The sealed end of the tube is sealed by means of a cap member fitted over the end of the tube. A spring is connected to the signal member to bias it for movement from the nonsignaling to the signaling position. A reel with a fishing line is mounted adjacent the sealed end of the tube. A magnetic coupling is provided between the reel and the end of the signal member which coupling includes a pair of permanent magnets, one of which is mounted on the reel and the other of which is mounted on the end of the signal member. The magnets are movable to a holding position where they will be in alignment with each other on opposite sides of the cap member on the end of the tube. The magnets, when in such holding position, provide a magnetic force greater than the spring biasing force to thereby hold the signal member in its nonsignaling position. When the reel is moved in response to pull on the line by a fish, the reel will be rotated causing the magnets to separate and thereby release the signal member for movement to its signaling position. The vertical position of the reel with respect to the sealed end of the tube can be adjusted to thereby adjust the sensitivity of the magnetic coupling.

5 Claims, 5 Drawing Figures

Patented Feb. 29, 1972

INVENTOR
BENJAMIN C. ROEMER
By Paul R. Puerner
ATTORNEY

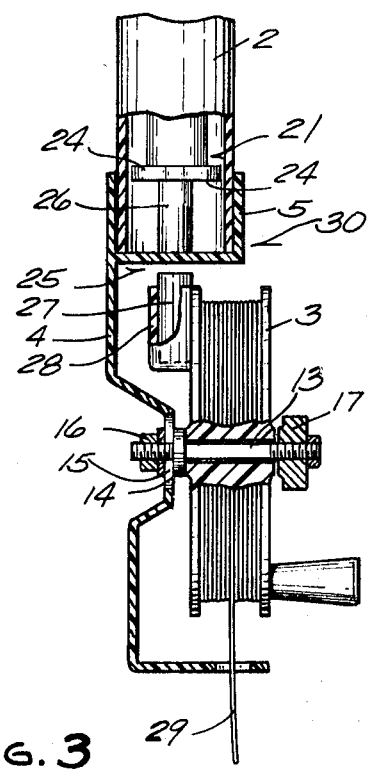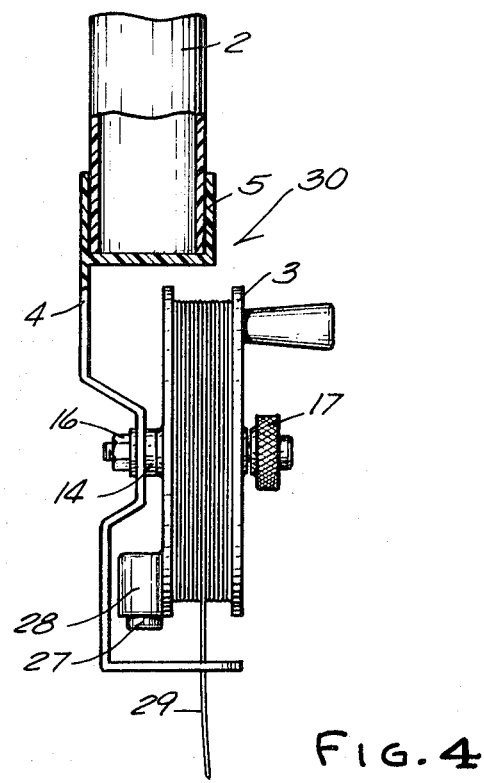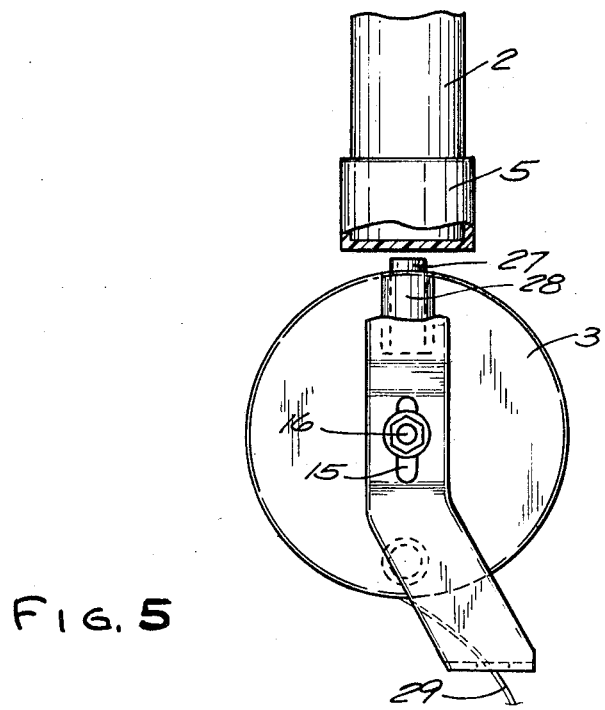

3,645,029

ICE FISHING TIP-UP

BACKGROUND OF INVENTION

The most pertinent prior art known to applicant is U.S. Pat. No. 3,213,561. The subject matter of this application incorporates certain improvements over the ice fishing tip-up disclosed and claimed in the above-identified patent.

In the present construction the magnetic coupling employed is comprised of two permanent magnets, one of which is mounted on the reel and the other of which is fastened to the end of the signal member. This arrangement permits the use of a simply constructed, easily assembled arrangement for sealing the end of the tube requiring no metallic member mounted in the tube end to concentrate the lines of force as in prior designs. In the present arrangement movement of the reel will release the signal member causing separation of the two permanent magnets to thus allow the reel to rotate freely once the magnetic coupling has been broken. Another improvement of this arrangement resides in the provision for a vertical adjustment of the reel with respect to the tube end to thereby allow adjustment of the sensitivity of the magnetic coupling as will be described in more detail hereinafter.

SUMMARY OF INVENTION

An ice fishing tip-up comprising a stand for positioning the tip-up on the surface of the ice and a tube having a sealed end positioned below the surface of the ice and an open end positioned above the surface of the ice. The end of the tube is sealed by a continuous imperforate wall of water impervious material extending across the end of the tube. A visual signal member or shaft is mounted within the tube and is biased by a spring member from a nonsignaling position within the tube to a signaling position outside the tube. A reel with a fishing line is rotatably mounted adjacent the sealed end of the tube. A magnetic coupling is provided between the reel and the end of the signal member. The coupling is comprised of a pair of permanent magnets, one of which is mounted on the reel and the other of which is fastened to the end of the signal member. The magnets on the reel and shaft are movable to a holding position wherein they will be in alignment with each other on opposite sides of the imperforate sealing wall at the lower end of the tube. When the magnets are in such holding position, they provide a magnetic force greater than the spring biasing force to thereby hold the signal member in its nonsignaling position. When the reel is moved in response to a fish striking the bait at the end of the line, the reel will be rotated causing the magnets to separate and thereby permit the signal member to move from its nonsignaling position to its signaling position. Such movement will separate the two magnets permitting free rotation of the reel.

The reel can be vertically adjusted with respect to the end of the tube to vary the spacing between the two magnets for the purpose of varying the sensitivity of the magnetic coupling.

DESCRIPTION OF THE DRAWINGS

FIG. 3 is a fragmentary front elevation view of the end of the tube and reel with portions of the device shown in cross section and with the parts of the magnetic coupling in the holding position;

FIG. 4 is a view similar to FIG. 3 but with the parts of the magnetic coupling shown in the nonholding or released position; and FIG. 5 is a fragmentary side elevation view of the reel and end of the tube with a portion of the tube broken away.

DESCRIPTION OF PREFERRED EMBODIMENT

Figures 1, 2:
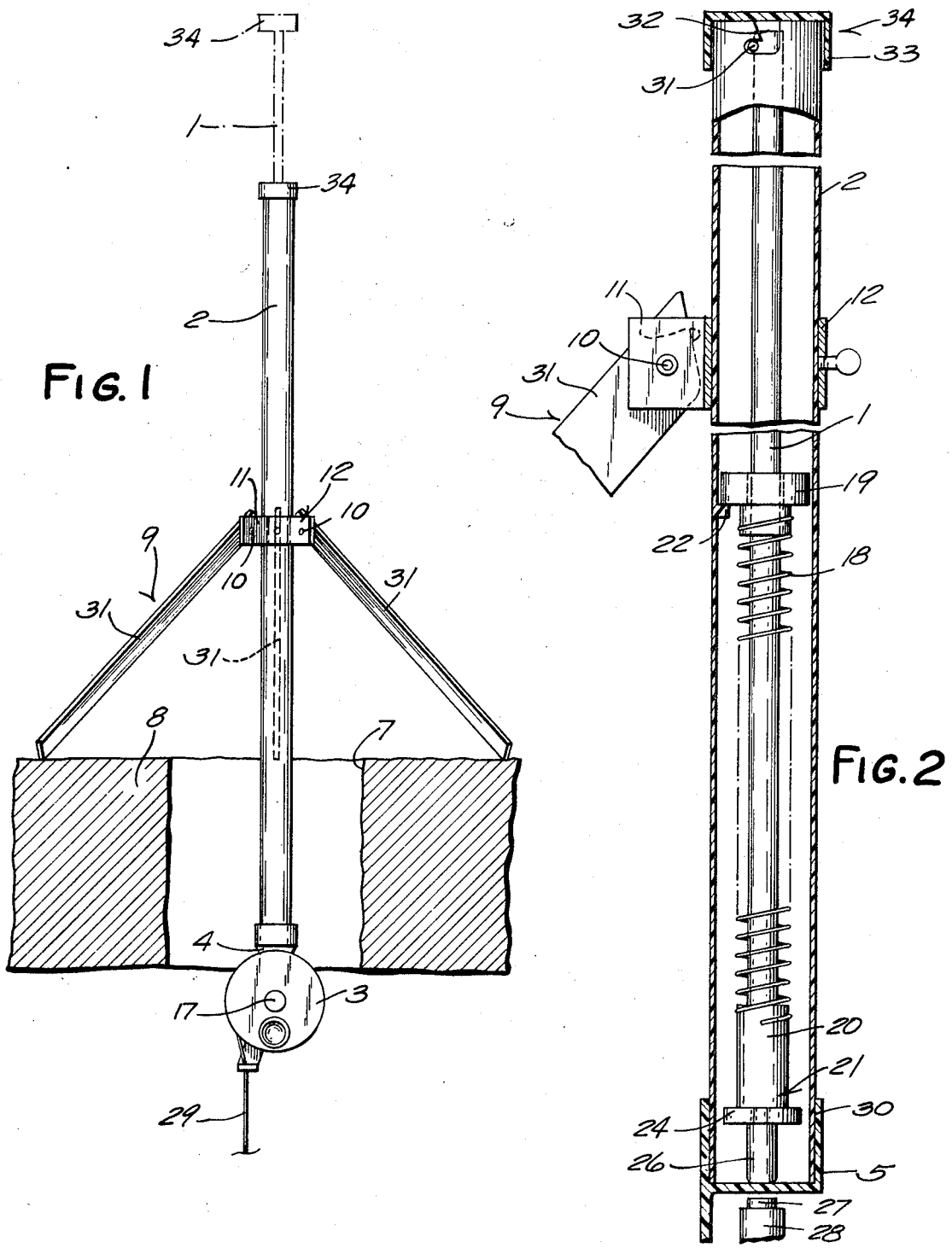
FIG. 1 is a side view of the tip-up as positioned on ice during fishing with the signaling member shown in dotted lines in its exposed signaling position.
FIG. 2 is a fragmentary side view of the upper portion of the tip-up device with a portion of the tube wall broken away to expose the internal construction of the device.

Referring to the drawings, my invention includes a signaling shaft 1 which is movable from a retracted nonsignaling position within a tube 2 (FIG. 2) to an exposed signaling position (shown in dotted lines in FIG. 1) in response to rotational movement of a reel 3 to give the fisherman a visual signal of a strike at the tip-up.

The bottom end of tube 2 is sealed by a sealing means 30 which in the preferred embodiment is comprised of a cap member 5 of nonmagnetic material preferably made from a suitable plastic which is fitted over the end of tube 2 and firmly secured thereon by a suitable adhesive (not shown). It should be noted at this point that sealing means 30 for the tube 2 is comprised of a simple one-piece cap of nonmagnetic material which in effect closes the end of the tube with a continuous imperforate wall of water impervious material.

Reel 3 is supported below the sealed end of tube 2 by means of a depending bracket member 4 which, in the preferred embodiment, is made integral with sealing cap member 5.

When the tip-up is in operation the tube is positioned in a hole 7 in the ice 8 as shown in FIG. 1 with the reel and tube end submerged in the water.

A collar mounted tripod stand means 9 retains the tip-up in operating position. The legs 31 of the tripod stand are pivotally mounted on a collar member 12 by means of rivets 10 which legs are adapted to pivot between a collapsed position (not shown) and a mounting position as shown in FIG. 1 wherein the upper beveled edges 11 of the legs abut with the outer periphery of tube 2. The collar mount 12 for the tripod stand is adjustable up and down the tube by means of a set screw to accommodate various ice thicknesses.

Reel 3 is rotatably mounted on bracket 4 by means of a horizontal shaft 13 of plastic material which is threaded at both ends and provided with an integrally molded spacer collar 14 as clearly shown in FIGS. 3 and 4.

The shaft is adjustably mounted on the bracket 4 through a vertically extending slot 15 by means of a threaded knob 16 which facilitates vertical adjustment of the reel on the bracket. A second threaded knob 17 is provided for adjusting the frictional drag on the reel.

As shown in FIG. 2, signaling shaft 1 is slidably mounted within tube 2 and biased to an exposed position by a tension spring 18. The bottom end of the spring is anchored to a plastic fitting 21 mounted on the end of shaft 1. The top end of spring 18 is fastened to a collar member 19 which in turn is slidably mounted on shaft 1.

When the shaft and spring assembly described above is inserted into the top of tube 2 and depressed to its retracted position (FIG. 2), collar 19 will be engaged by a stop member 22 mounted inside tube 2 which in turn will place spring 18 in tension to thereby bias shaft 1 upwardly in tube 2. Fitting 21 is provided with three equally spaced, radially extending arms 24 which serve to center shaft 1 as it moves up and down in tube 2.

To retain the signaling shaft 1 in the retracted position the tip-up assembly is provided with a magnetic coupling means 25 which is comprised of a pair of permanent magnets 26 and 27. In the preferred embodiment magnets 26 and 27 are bar magnets having a circular cross section. The first magnet 26 is glued or otherwise fastened to the lower portion of fitting 21 whereas the second magnet 27 is attached to reel 3 in direct alignment with magnet 26 when the magnets are in their coupling position as shown in FIG. 3. Magnet 27 is attached to reel 3 by any suitable means such as insertion in a cylindrical housing 28 integrally molded on the side of the reel and retained therein by a suitable adhesive. The position of magnets 26 and 27 is such that the north pole of one magnet will lie directly opposite the south pole of the other magnet when in the FIG. 3 position.

Magnets 26 and 27 are chosen so that the magnetic field created is of sufficient strength to overcome the bias of spring 18 when in its loaded or retracted position. Upon rotation of the reel in response to a pull on the line 29, the magnets are moved out of alignment with each other. This breaks the magnetic lines of force which hold signaling shaft 1 in its retracted nonsignaling position, thus releasing said shaft for movement to its signaling position under the bias of spring 18. Upon upward movement of shaft 1, magnet 26 fastened to the end thereof and magnet 27 on the reel will be sufficiently spaced from each other to thereby allow free rotation of reel 3 on shaft 13.

A cap 34 having a dependent flange 33 is secured to the top of signaling shaft 1 and is adapted to overlie the open upper end of the tube 2. A pin 31 fastened to flange 33 is adapted to cooperate with an L-shaped notch 32 in the tube to lock the signaling shaft within the tube when the tip-up assembly is not in use.

It can thus be seen that the instant invention permits adjustment to be made with respect to the sensitivity of the described trigger mechanism.

Such adjustment is facilitated by knob 16 which adjusts the horizontal reel shaft 13 up and down within the vertically extending slot 15 of the downwardly extending bracket. As the distance between the reel and the base cap is increased the magnetic lines of force are weakened thus making the trigger mechanism more sensitive.

I claim:

1. An ice fishing tip-up, comprising:
   a stand means for positioning the tip-up on ice;
   a tube means having a sealed end which is sealed by a sealing means and an open end, said tube means connected to said stand means so that said sealed end is in a position below the surface of the ice when said stand is positioned thereon and said open end is projecting above the surface of the ice, said sealing means including a continuous, imperforate wall of water impervious material extending across the end of said tube means;
   a visual signal member mounted within said tube and movable in both directions between a nonsignaling position within said tube and a signaling position outside of said tube;
   spring means connected to said signal member to bias said signal member for movement from said nonsignaling position to said signaling position, said spring means exerting a biasing force in a direction of said movement of said signal member when said signal member is in said nonsignaling position;
   a reel means for accommodating a fishing line;
   a support means for supporting said reel means adjacent said sealed end of said tube means;
   a reel mounting means for rotatably mounting said reel means on said support means;
   magnetic coupling means including a pair of permanent magnets, one of said magnets mounted on said reel means for movement therewith and the other of said magnets mounted on the end of said signal member for movement therewith, said magnets being movable to a holding position wherein they will be in alignment with each other on opposite sides of said imperforate wall, said magnets when in said holding position providing a magnetic force greater than said spring biasing force to thereby hold said signal member in its nonsignaling position, said reel means when rotated causing said magnets to separate to thereby permit said signal member to move from its nonsignaling position to its signaling position under the bias of said spring means, said support means for said reel includes means for vertically adjusting said reel so that the spacing of said magnets when in holding position can be adjusted.

2. The combination according to claim 1 in which said sealing means at the sealed end of said tube means is comprised of a cap member fitted over the end of said tube means with said support means for supporting said reel comprising a depending bracket member which is made integral with said cap member.

3. The combination according to claim 2 in which said reel support means includes a shaft member on which said reel is rotatably mounted, said bracket member having a vertically extending slot therein in which said shaft is adjustably mounted to facilitate vertical adjustment of said reel means with respect to said tube means.

4. The combination according to claim 3 in which said shaft member is made of plastic material and includes an integrally molded spacer collar thereon located between said bracket member and said reel means.

5. The combination according to claim 1 in which said spring means is comprised of a tension spring fastened at one end to the lower end of said signal member and fastened at the other end to a collar member which is slidably mounted on said signal member, said spring means further including a stop member on the inside of said tube means adapted to engage said collar member when said signal member is moved to its nonsignaling position to thereby place said tension spring under tension.

* * * * *